INVENTOR.
GENE D. HODGE.
BY Milton W. Lee AGENT.
Harry M. Saragovitz,
Edward J. Kelly &
Herbert Berl
ATTORNEYS INVENTOR
GENE D. HODGE.
BY Milton W. Lee AGENT.
Harry M. Saragovitz,
Edward J. Kelly &
Herbert Berl
ATTORNEYS.

April 7, 1970 G. D. HODGE 3,505,479

MULTIPLEX SYSTEM WITH NUMBER OF CHANNELS CONTROLLED ACCORDING TO SIGNAL-TO-NOISE RATIO

Filed Dec. 21, 1967 4 Sheets-Sheet 3

INVENTOR
GENE D. HODGE

BY Milton W. Lee AGENT.
Harry M. Saragovitz, Edward J. Kelly & Herbert Berl

ATTORNEYS.

INVENTOR
GENE D. HODGE.
BY Milton W. Lee AGENT
Harry M. Saragovitz,
Edward J. Kelly &
Herbert Berl ATTORNEYS

United States Patent Office 3,505,479

Patented Apr. 7, 1970

3,505,479

MULTIPLEX SYSTEM WITH NUMBER OF CHANNELS CONTROLLED ACCORDING TO SIGNAL-TO-NOISE RATIO

Gene D. Hodge, Rockville, Md., assignor, by mesne assignments, to the United States of America as represented by the Secretary of the Army

Filed Dec. 21, 1967, Ser. No. 692,348
Int. Cl. H04j *3/16*
U.S. Cl. 179—15 3 Claims

ABSTRACT OF THE DISCLOSURE

An adaptive control unit for a multiplexer which continuously monitors the channel signal-to-noise ratio and automatically adjusts the number of channels multiplexed to maintain a selected minimum quality signal.

BACKGROUND OF INVENTION

This invention relates generally to a multichannel satellite communication system using angle modulation with optimum efficiency, and more particularly to an adaptive control unit to maintain a preselected signal-to-noise ratio (SNR) in the active voice channels as the down-link carrier-to-noise ratio changes.

In recent years, there has been increasing work in the area of adaptive radio communication systems. Adaptive systems generally seek to combat the influence of ionospheric and tropospheric disturbances by measuring the transmission characteristics of the medium and adjusting the communication equipment to compensate on a real-time basis. The principle generally used is to match the transmission function of the equipment to that of the transmission medium and so achieve the maximum signal-to-noise ratio.

Communication via a satellite repeater can be reliably provided over great distances with relative independence from ionospheric and tropospheric disturbances that limit the effectiveness of other systems. However, adaptive capability in a satellite system is needed to combat varying down-link signal-to-noise ratio, which is caused by changing slant range in a medium altitude orbit, by rain, and by multiple access. The multiple access contribution to the link losses is encountered in a system having a fixed power output that must be shared by each of the signals entering the satellite simultaneously. In addition, these multiple carriers will generate intermodulation products that are additive to the channel thermal noise, further reducing the channel signal-to-noise ratio.

SUMMARY OF THE INVENTION

The multiplexer for the satellite communication system ground terminals designed for communication satellite system application has adaptive capabilities designed to make most efficient use of a satellite link under varying conditions, in addition to providing a larger traffic capacity and transmission quality at strategic system standards.

In order to achive efficient use of the limited satellite down-link power, the adaptive portion of the communication system trades bandwidth for predetection signal-to-noise ratio. The system herein described adapts by seeking to match the information rate to the transmission medium as a function of the time-varying signal-to-noise ratio in the communication system. The need for the ability to adapt during the sense state arises from the threshold effects inherent in the chosen modulation technique.

The general purpose of this invention lies in the provision of an adaptive control subsystem for a multiplexer system which monitors channel test-tone-to-noise ratio continuously, converts the information to digital form, processes the information against the operating requirements of system capability, coordinates adaptive changes with the distant multiplexer, generates control signals defining the adaptive state of the multiplexer, and drives displays for an operator control panel.

BRIEF DESCRIPTION OF DRAWINGS

The exact nature of this invention will be readily apparent from consideration of the following specification relating to the annexed drawings in which.

DESCRIPTION OF THE INVENTION

Figure 1:
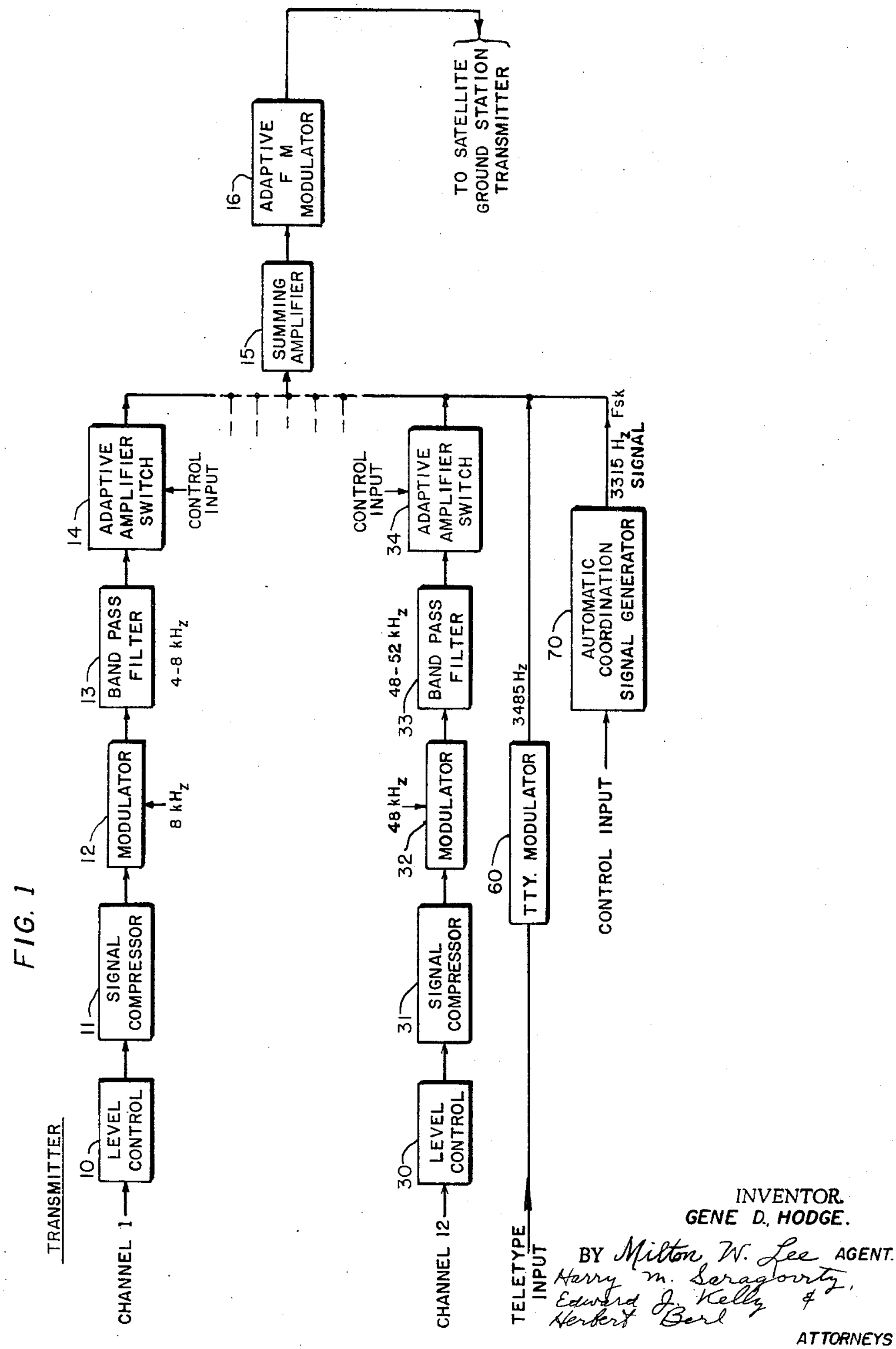
FIGURES 1 and 2 show the transmitting and receiving sides of a multiplexer displaying one environment in which the automatic adaptive control unit of the instant invention can function effectively.
Figure 2:
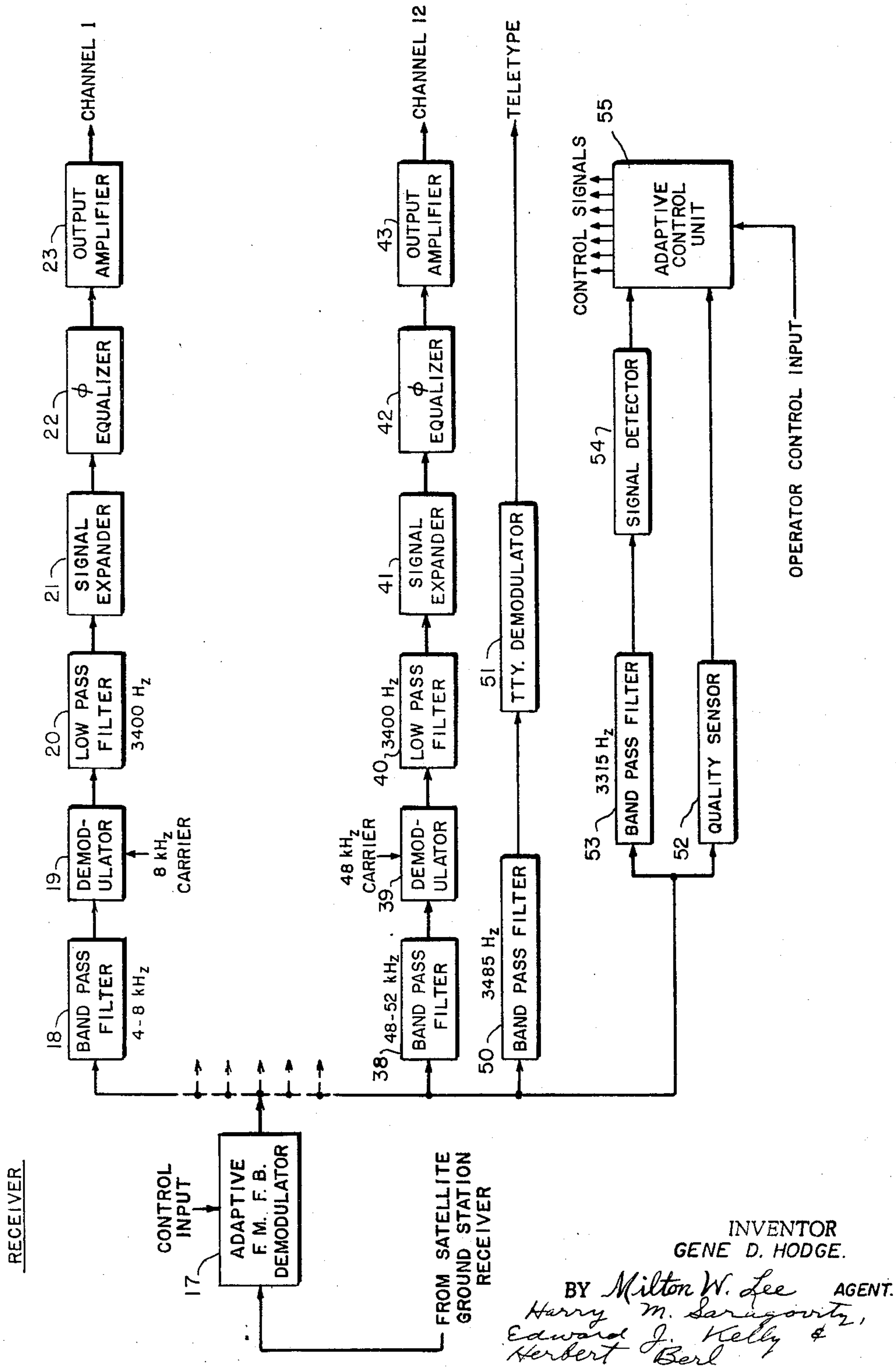

Before entering into a detailed description of the drawings, it would perhaps be beneficial to briefly view the entire system in perspective. One embodiment of this invention, as shown in FIGURES 1 and 2, envisions an adaptive multiplexer for up to 12 high-quality voice channels with maintained coordination between the two multiplexers communicating over each channel or link. Each multiplexer must be in the same adaptive state at all times. Therefore, any adaptive changes must be coordinated so that each multiplexer changes in the same way at the same time. A typical link has two multiplexers operating full duplex through the satellite. Each multiplexer has automatic coordination capability so that each has the same number of active channels. The multiplexer incorporates an FM modulation step for compatibility with the ground station; the FM modulation index on the transmit side and the loop gain and bandwidth of an FMFB detector on the receive side are automatically optimized to prevailing signal characteristics. A small special purpose computer controls the multiplexer based on measured link conditions and operator inputs. The multiplexer monitors channel signal-to-noise ratio continuously, and automatically adjusts the number of channels multiplexed to maintain a selected minimum quality. The upper channels in the multiplex signal are added or dropped depending on prevailing link conditions.

The individual block diagram circuits of FIGURES 1 and 2 will not be specifically described as the multiplexing units themselves are well known in the art. However, it is well to visualize the working environment of the channel quality sensor 52 and the adaptive control unit 55 which provides the novel techniques of the instant invention.

The transmitting portion of the multiplexer is shown in FIGURE 1. In the embodiment shown, twelve channels are available for multiplexing with each channel comprising a level control circuit 10 for measuring the peak input signal voltage which is compressed in signal compressor 11. Compressor 11 is one half of a compander comprising the compressor 11 of FIGURE 1 and the expander 41 of FIGURE 2. The objective of the compander is to restrict the short term dynamic range of speech signals while not distorting the long term speech waveform. The compander works with the syllabic structure of speech, reducing the dynamic range of syllables while preserving long term variations. If the amount of compression in the compressor is equal to the expansion in the expander, there is no distortion of speech in transmission through the whole system, provided the compressor and expander actions are coordinated properly. The compressed signal in channel 1 is modulated by an 8 kHz. carrier signal in modulator 12. By utilizing a separate carrier source for every two channels, a twin-channel scheme may be used in generating single sideband signals. For each pair of channels 1–2, 3–4, 5–6, 7–8, 9–10, 11–12, carrier signals of 8 kHz., 16 kHz., 24 kHz., 32 kHz., 40 kHz., and 48 kHz. respectively, are used with bandpass filters in each pair of channels for picking the upper sideband in the first channel of each pair and the lower sideband in the other channel of each pair. The output of modulator 12 is applied to the 4–8 kHz. bandpass filter 13 which picks either the upper or lower sideband as appropriate for that channel. The filter output is then fed to a switched isolation amplifier, shown as adaptive amplifier switch 14, which isolates the bandpass filter and provides the capability for switching channels on and off as link conditions permit. In addition to the twelve channels, there are three data channels consisting of two teletypewriter channels (only one teletypewriter channel is shown in FIGURE 1) required of the multiplexer in the normal mode and a coordinating channel for coordinating adaptive changes at both terminals. Summing amplifier 15 of FIGURE 1 functions to add the 12 voice channels, each occupying a different 4 kHz. band, and the three data signals in the 0–4 kHz. band to produce the multiplex signal occupying the 0–52 kHz. band. The summed signal drives an FM modulator 16 for producing a signal for the satellite ground station transmitter.

The signal transmitter by the satellite ground station transmitter in response to the signal from the FM modulator 16 of FIGURE 1 is received by the adaptive demodulator 17 of FIGURE 2 and applied to the multichannel network through bandpass filters depicted as filters 18, 38, 50 and 53. After side-band selection, the signal is then demodulated in a demodulator 19 by a carrier signal of the same frequency as that of the corresponding modulating carrier signal for the corresponding channel in the transmitter of FIGURE 1. The demodulator in each channel of the receiver of FIGURE 2 and the modulator in each corresponding channel of the receiver of FIGURE 1 may comprise a single balanced modulator circuit that serves as modulator or demodulator. The demodulated signal is then filtered in the 3400 Hz. range by a low pass filter 20 and expanded in signal expander 21 to complete the compander activity as earlier explained. The expanded signal is then fed to a phase equalizer 22 which meets the envelope delay distortion requirements of each channel. The final circuit on the receive side of the multiplexer is the output amplifier 23 which provides the audio output signal of the receiver.

The adaptive control subsystem of FIGURE 2 comprising a channel quality sensor 52, which is a kind of analog-to-digital converter, and an adaptive control unit 55 which is a small special purpose digital computer, continuously samples the quality of the satellite link and controls the number of multiplexed channels.

In order to accomplish this adaptive process the channel quality sensor provides inputs to the adaptive control unit in the form of signals which are analogous to channel quality. These inputs are sampled periodically by the adaptive control unit in order to determine if, and to what extent, adaptive changes may be necessary.

Figure 3:
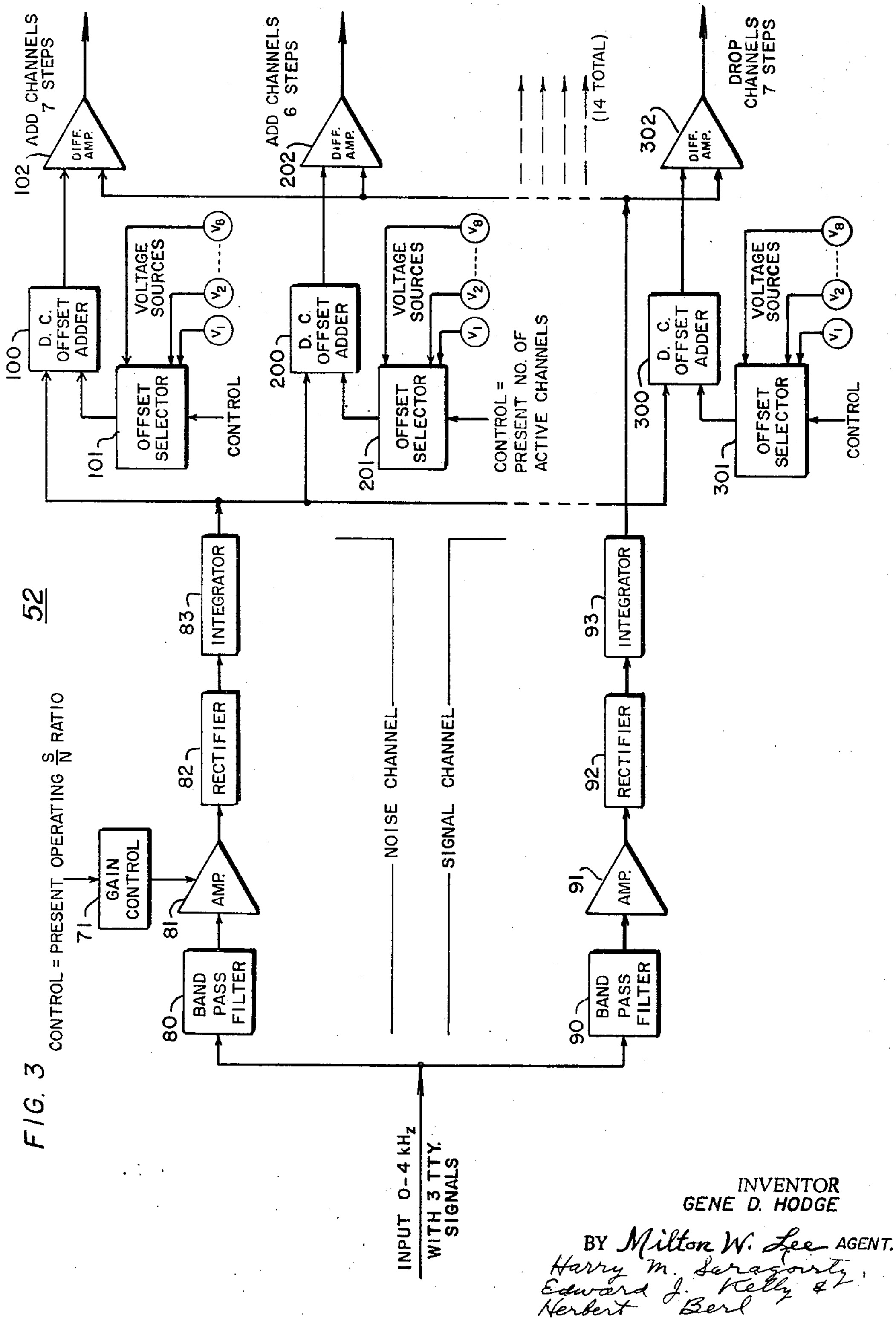
FIGURE 3 shows one arrangement for a channel quality sensor which would function effectively to provide continuous information to the automatic adaptive control unit.

These input signals are of the form of binary voltage levels derived from the output of high gain differential amplifiers shown in FIGURE 3 as amplifiers 102, 202 and 302. At the inputs to these amplifiers are DC offset adders 100, 200 and 300 which provide bias voltages based on the relation between the amount of noise in a channel and the number of channels the link can support. For example, when the noise in a channel increases such that the mean SNR falls below the minimum, it is important to know whether one, two, three, or how many channels must be dropped in order to restore the selected SNR to at least the minimum. The DC offset adder circuits 100, 200 and 300 add a calculated offset voltage to the integrated noise voltage such that the offset plus the DC noise voltage reaches a predetermined threshold value at each offset adder circuit output for a particular noise condition. The threshold noise input is different for each of the 14 offset adders in the 12 voice channels and 2 teletypewriter channels. These 14 outputs represent the 14 possible adaptive changes the system can make as a function of noise on the link.

By the arrangement of the individual biasing levels, these differential amplifiers are arranged in two groups of seven, the add channel group and the drop channel group. Successive outputs are derived from a particular group as a result of link conditions degrading or improving.

From the preceding it is seen that if the link noise condition at any given point in time is such that N channel groups must be dropped in order to achieve the desired link SNR, then N of the differential amplifiers which are biased to detect degrading link conditions will provide a logic output.

Thus, when the drop channel group of amplifiers senses a degrading channel quality, logic outputs are provided which are different from quiescent conditions and result in an indication that the integrated noise level of the channel has approached the signal level to such a degree that the selected SNR can no longer be maintained as a minimum unless adaptive action is taken.

The fact that a single signal amplifier stage of the sensing element provides an output is an indication that the situation can be corrected by dropping the single group of lowest priority channels, at that point in time, from the multiplexed baseband signal.

After the appropriate adaptive control action called for has been taken, the SNR would then improve such that, after sufficient time had elapsed for stabilizing the output, the sensing amplifier stage would return to the quiescent state.

If N amplifier stages had provided an output the indication would have been that N of the lowest priority channel groups required deletion in order to regain the selected SNR as the lower bound of mean channel quality.

By similar biasing arrangements, sensing amplifiers are configured in the add channel group to recognize when the signal level is sufficiently greater than the noise to enable the addition of channel groups while still maintaining the selected SNR as the lower bound.

In a manner identical to the drop channel sense amplifiers, each output of the sensing amplifiers recognizing improving conditions correlates, at a given point in time, with a group of channels which may be added to the multiplexed signal.

The requirement, therefore, for the adaptive control unit 55 of FIGURE 2 is to transform these outputs of the channel quality sensor 52 of FIGURE 2, which occur whenever integrated noise levels fall within specified ranges of the signal level, into control signals which indicate the appropriate adaptive action to be taken in terms of which channel groups to add or drop.

The action required of the adaptive control unit is complicated by the fact that there is no prearranged fixed relationship between the outputs of the sensing amplifiers and the channel groups controlled. The relationship that exists is a function of the current state of system operation which is predicated upon link conditions and previously implemented adaptive measures.

In the process of adapting system characteristics, care must be exercised to insure that earth terminals are properly coordinated such that the system parameters of earth terminals communicating with each other are simultaneously modified to the new adaptive state. This is necessary in order to minimize the effects of the transient conditions associated with implementing the adaptive change. Such a response, if not properly controlled, would impact the traffic of users employing the network during the adaptive change and consequently cause undue errors or gaps in communication during that period.

Therefore, the adaptive control system must implement the means whereby the various earth terminals can be interrogated in regard to locally sensed equipment status and link quality. In addition, when these inputs have been collected and correlated by the local processor and adaptive decisions have been made, adaptive commands must then be generated. In order to properly coordinate the simultaneous implementation of the adaptive changes at each earth terminal the adaptive command process must compensate for differences in propagation delay between the group control processor and the various earth terminals.

The adaptive change is accomplished in a two step process in order to minimize the time interval in which the two ground terminals are in different adaptive states as a result of a change being implemented. Thus, the transmitter and receiver are adapted independently. Upon activation of a change, the coordination message is transmitted with the transmitter and received in the un-adapted state. This is the same state as the remote station, which for this particular change, is being controlled as a slave. Immediately after transmitting the command to initiate the adaptive change, the transmitter switches to implement the new adaptive parameters. After receipt of the message calling for an adaptive change the remote receiver immediately switches to the new parameters specified by the message. Thus, the transmitter of the local terminal and the receiver of the remote terminal are in a common adaptive mode. To complete the change the remote station transmitter, having sensed that its receiver has implemented a change, acts in an identical manner to adapt the receiver at the local station to the adaptive state requested. The adaptive state of the terminal is directly controlled based on what is stored in the contents of the actual status buffer. In the manual mode, commands from the control panel are stored in the buffer as are commands from the remote terminal in the slave mode.

A technique for the control of adaptive measures has been devised based on an assumed system implementation. The assumed implementation allows either terminal ground station on a satellite links to sense a need for adapting. Having done so, it then asumes a master station role and carries out the required measures to adjust system parameters and channel allocation while simultaneously commanding the other terminal of the link to carry out the same adaptive measures. The terminal initially sensing the need of an adaptive change assumes the role of master for implementing that particular change. Implicit in this scheme of operation is that the master station must have complete knowledge of the sense quality of the slaved terminal in order to insure the adaptive change requested is compatible with both terminals. In addition, manual or automatic interpretation of the adapt request should be provided for with circuitry to implement the corrective adapt procedure.

When a need for adapting is detected at the comparator device, or when the appropriate adapt command is received over the Order Wire channel, indicators are lighted on a control panel showing the appropriate action to be taken in terms of channels to be cut off or added, deviation limits, power control and bandwidth control. After sufficient time has lapsed for warning the respective channels of the adaptive measures being taken the service is terminated or reinstituted on a per channel basis either manually or automatically, depending on the operating mode until the required grade of service has been achieved.

The fundamental adaptive control process in the system concept is implemented at the link level by adaptive control of two or more earth terminals sharing a common channel in the satellite.

That is to say, as an example, an indication sensed by the quality sensor to add N channels must be interpreted so as to add the next N channels in the group priority sequence. This action is based on the adaptive control unit having knowledge of the current number of channels on the air and, therefore, which channel groups are to be added. Having added these groups, and allowed sufficient time for stabilization of sensor outputs to the quiescent zero state, the adaptive control unit must then be conditioned to interpret the next input (which may be identical to the last, in terms of the specific sense amplifier outputs changing) properly such that the appropriate adaptive action is taken.

Figure 4:
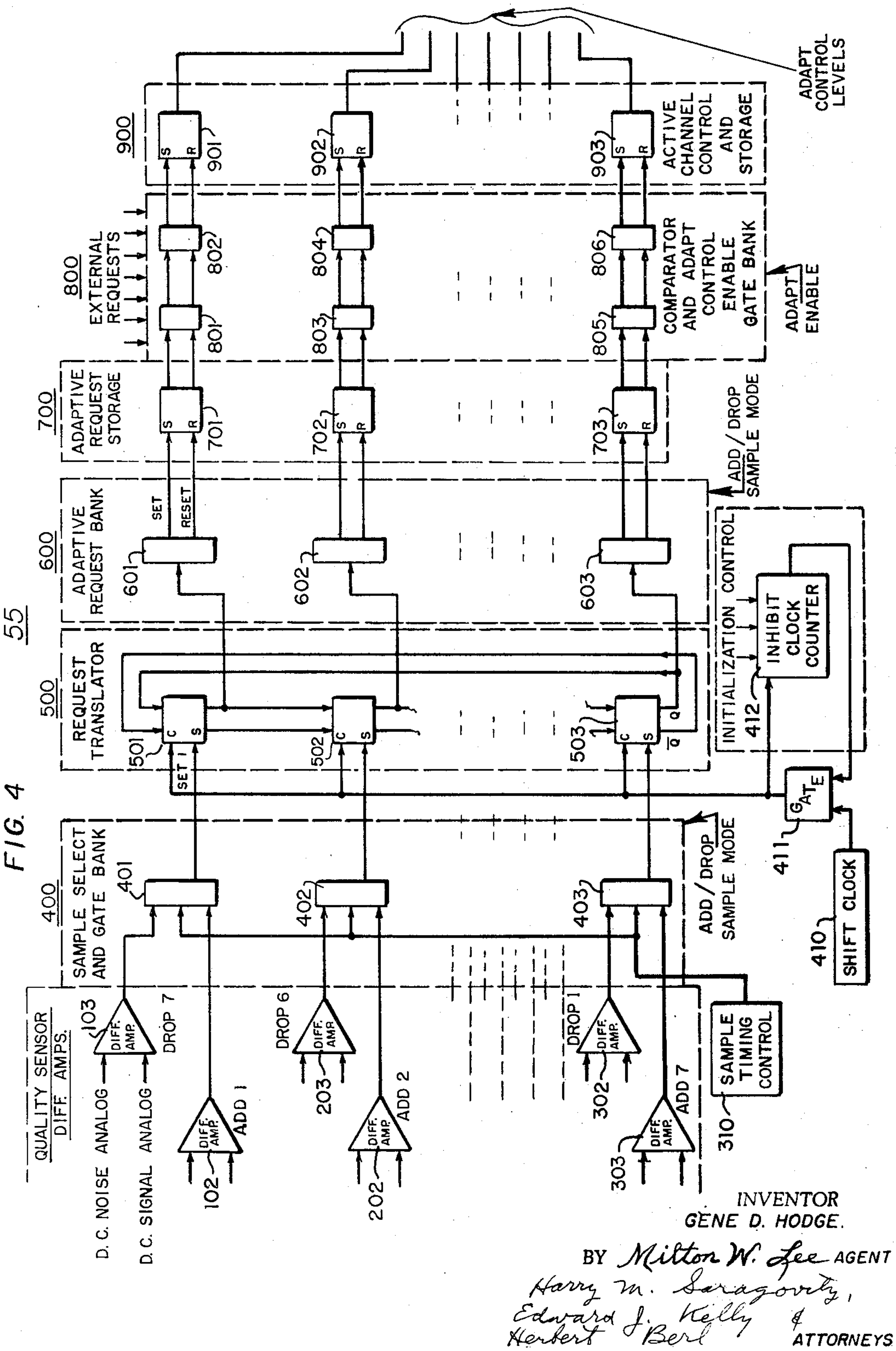
FIGURE 4 shows the crux of the instant invention in the form of an adaptive control system.

Operation of the adaptive control logic can be explained with reference to the vertical banks of flip-flops 500, 700 and 900 in FIGURE 4, each with seven stages, and the associated gates 400, 600 and 800 between the banks. The first bank 500 on the left has two functions. It stores the sampled output of the link quality sensor shown in FIGURE 3, and it translates the output from the form of requested changes into requested multiplexer status, in terms of which of the channels are requested to be on. The output of the link quality sensor indicates a need to add or drop channels; however control action must be based on knowledge of the number of channels on the air as well as requested changes. This first bank of flip-flops 500 adds present multiplex status information to requested change information to get requested multiplexer status. The operation is performed in two steps. First, the bank of gates 400 between the link quality sensor outputs of FIGURE 3 and the flip-flop bank 500 is turned on to alternatively sample the add bank and the drop bank at the link quality sensor output. The sampling is done at the rate of once per second. If the link quality sensor senses no adaptive change required, all its outputs will be logical zeros. If an adaptive change is necessary, logical ones will sequentially appear at the outputs of the amplifiers 102, 202 etc. of FIGURE 3. Each "one" corresponds to an adaptive request which affects one group of channels. The bits which appear at the output points at the time of sampling occurs, the seven bits are transferred into the seven corresponding flip-flops in the bank, then the gates close. The next operation is the translation of the stored link quality sensor output into a requested multiplexer state. The bank of flip-flops 500 becomes a seven-stage shift register with output connected back to input in performing that task. A 75 c.p.s. shifting clock 410 is gated by gate 411 to the shift register, which is connected so that the register contents clock downward, referring to the diagram, by a predetermined number of shifts. The number of shifts is determined by the number of channels actually on the air at any given time. The objective of the shifting operation is to move any 1 bits stored in the register by the link quality sensor into the stage of the register that corresponds to the channels that would be affected by the called-for change. After this shifting operation has been completed, the contents of the shift register indicate directly what status the link quality sensor is calling for.

A logical 1 in any stage means that the link quality sensor is calling for that channel or group of channels to be added or dropped, depending on the sampling mode.

The next event is the transfer of any requested changes into the bank of seven flip-flops 700 to the right. The only function of that bank 700 is to store the requested state of the multiplexer. The bank is undated once per second as the link quality sensor outputs are sampled. Logical ones in the shift register act to set the appropriate stages of the request registers to the logical one state when the cycle is in the drop mode. Correspondingly, logical ones in the shift register are used to reset these registers when in the add mode.

The last bank of seven flip-flops 900 on the right contains the actual status of the multiplexer at all times. A logical 1 in any flip-flop means that the corresponding channels are off the air. The array of gates between the bank containing the requested status and the actual status bank is controlled so that the requested status is transferred into the actual status bank when an adaptive change is permitted. The adaptive state of the multiplexer is directly controlled based on what is stored in the seven flip-flops of the actual status bank.

There are several ways to make a data transfer into the actual status bank, and therefore to control the state of the multiplexer. One is that just discussed: a transfer from the requested status bank. However, before such a transfer can take place, it must be enabled. The method of enabling depends on what operating mode the multiplexer is in. If the multiplexer is in the automatic mode the enable signal is provided automatically after a fixed time delay whenever the need to make a change is sensed. In the auto/permission required mode, the enable signal is generated when a controller pushes the ENABLE button on the control panel, not shown. However, the transfer into the actual status bank occurs only for those changes that can be supported by both ends of the link. The seven inputs to the gate array labeled $A_{IR}$ through $G_{IR}$ are generated by the coordination logic based on what the multiplexer at the other end of the link senses it can support i.e. the external requests. A transfer from any flip-flop of the request bank to the corresponding flip-flop of the actual bank is enabled only if the link quality sensor at the distant multiplexer is showing that the change can be supported. Of course, this restriction has meaning only within the context of adding channels. Either end can always support dropping channels except when the system is operating with only a single teletypewriter channel on. In that case, the link quality sensor is interlocked from generating a need to drop channels.

Another way transfers can occur into the actual bank is through pushbutton action at the control panel when the system is in the manual mode. In this mode, pushing a channel button on the control panel results in transferring a logical 1 into the corresponding flip-flop of the actual bank, thereby putting that many channels on the air. When the multiplexer is in the manual mode, the actual bank can be changed only through pushing the appropriate channel buttons, but the rest of the adaptive control logic continues to operate so that the multiplexer can immediately go into another operating mode.

Still another mode of effecting a change in the actual bank is through remote commands from the distant multiplexer, operating in the manual mode. When either multiplexer on the link goes into the manual mode, the other multiplexer automatically goes into the slave mode. All inputs to its actual bank then come from the master multiplexer at the distant terminal, via the coordination data signal and the coordination logic.

It will be apparent that the embodiment shown is only exemplary of a product of the method of manufacture of an adaptive control unit for a multiplexer and that various modifications can be made in construction and arrangement within the scope of the invention as defined in the appended claims.

What is claimed is:

1. In a single sideband suppressed carrier-frequency division multiplexer, an adaptive control subsystem which continuously monitors the channel signal-to-noise ratio in multiple active voice channels and automatically adjusts the number of channels multiplexed to maintain a selected minimum quality signal comprising:

a channel quality sensor for measuring the test-tone-to-noise ratio directly at audio having a first channel and a second channel which distinguish between a noise signal and an information signal and passes the appropriate signal through each respective channel for the application thereof to a DC offset amplifier arrangement, wherein a calculated offset voltage is applied to the noise signal such that the offset plus the DC noise voltage reaches a predetermined threshold value at each offset adder circuit output for a particular noise condition, and the resultant output is applied to respective banks of differential add or drop amplifiers for providing binary control voltage signals to an adaptive control unit;

an adaptive control unit for receiving the binary output control signals from the quality sensor and upon sensing of a need for adapting the number of channels employed, an adapt signal is applied to the local terminal of the link for effecting the necessary adjustments in priority channels and for simultaneously commanding the distant terminal of the link to carry out the same adaptive measures.

2. The apparatus as set forth in claim 1, wherein the adaptive control unit is a small special purpose digital computer consisting of at least first, second and third vertical banks of flip-flops interconnected with appropriate gating networks wherein the first bank stores the sampled output of the link quality sensor and translates the output from the form of requested changes into requested multiplexer status, the second bank stores the requested state of the multiplexer and the third bank continuously maintains the actual status of the multiplexer at all times.

3. The apparatus as set forth in claim 2 wherein a gating arrangement interconnects the link quality sensor and the first bank of flip-flops and is externally triggered by a clock pulse for alternatively sampling the add bank and drop bank of the quality sensor at a predetermined rate.

References Cited

UNITED STATES PATENTS

| | | |
|---|---|---|
| 2,300,415 | 11/1942 | Green. |
| 2,517,365 | 8/1950 | Baeyer. |
| 3,389,225 | 6/1968 | Myers. |

RALPH D. BLAKESLEE, Primary Examiner